G. W. BILLINGS.
Flax and Hemp Drying Frame.
No. 40,155.                                   Patented Oct. 6, 1863.
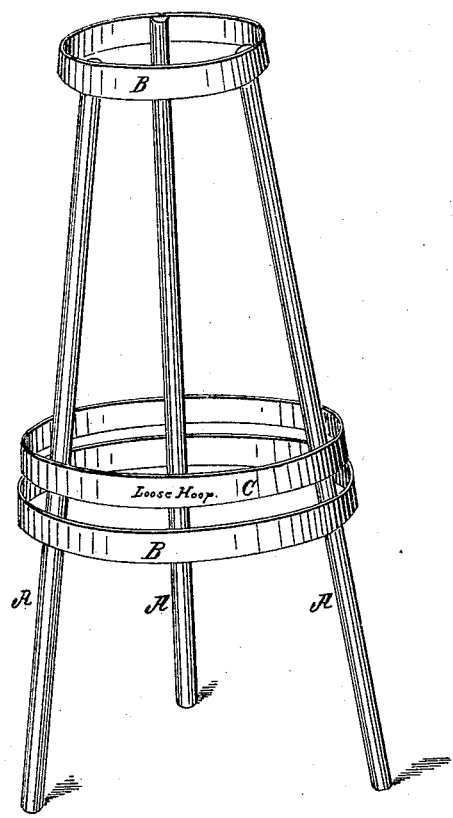

UNITED STATES PATENT OFFICE.

GEORGE W. BILLINGS, OF NEW YORK, N. Y.

FLAX AND HEMP DRYING FRAME.

Specification forming part of Letters Patent No. 40,155, dated October 6, 1863; antedated September 21, 1863.

*To all whom it may concern:*

Be it known that I, GEO. W. BILLINGS, of the city and county of New York, and State of New York, have invented a new Mode of Drying Flax, Hemp, and other Substances; and I do hereby declare that the following is a full and exact description thereof, reference being had to the accompanying drawings, and to the letters of reference marked thereon, making a part of this specification.

The nature of my invention consists in having a portable frame, constructed of wood, iron, or other suitable material, in such form as to leave a cavity inside the frame to allow a free passage of air, and to apply a device for fastening to the frame in a rapid and simple manner whatever is placed around the outside of it to dry. For this purpose I make my frame of three uprights or standards, A A A, two inches square, or round, four feet long. I fasten to these standards two hoops, B B, made of suitable material, one at the top and the other five-eighths the distance from the top to the bottom of the standards. When the material to be dried is placed around the frame, I place a loose hoop, C, over the whole, which keeps it firmly in position until in condition to be removed. If required, more than one loose hoop may be used, and more than three standards and three hoops may be used in the construction of the frame.

This device is more particularly designed for flax and hemp, which has been retted in water. When they are first removed from the retting vat, the stalks are limber and require support to keep them upright or in position where the water can pass away without obstruction; also, when, in the process of drying, the stalks are wet with rain, the water passes away and with fair weather they are soon dry again.

In gathering flax and hemp from the field, when first cut or pulled the drier can be used to advantage, particularly in curing flax, which when thickly sown, the stalks are fine and limber, requiring support. By placing the flax around the drier in a green state it cures evenly and does not become sunburned, as when laid flat upon the ground.

There are various uses to which the drier can be applied besides those above specified.

Having fully described my invention, what I claim as my invention, and desire to secure by Letters Patent, is,—

The frame A A A and hoops B B, in combination with the loose hoop C, substantially as described and set forth.

GEO. W. BILLINGS.

Witnesses:
 JOHN S. HOLLINGSHEAD,
 JOS. PECK.